United States Patent
Morikawa et al.

[11] Patent Number: 5,687,008
[45] Date of Patent: Nov. 11, 1997

[54] IMAGE READING APPARATUS

[75] Inventors: Hideki Morikawa; Junichi Masuo; Norizo Takao; Masahide Okazaki, all of Kyoto, Japan

[73] Assignee: Dainippon Screen Mfg. Co., Ltd., Japan

[21] Appl. No.: 584,380

[22] Filed: Jan. 11, 1996

[30] Foreign Application Priority Data

| Jan. 11, 1995 | [JP] | Japan | 7-002908 |
| May 25, 1995 | [JP] | Japan | 7-126676 |
| Aug. 30, 1995 | [JP] | Japan | 7-221779 |

[51] Int. Cl.$^6$ .............. H04N 1/04; G02B 9/00; G02B 27/02; G02B 5/00
[52] U.S. Cl. .............. 358/475; 358/475; 358/474; 358/494; 359/894; 359/798; 359/740
[58] Field of Search .............. 359/894, 740, 359/679; 358/474, 475, 494

[56] References Cited

U.S. PATENT DOCUMENTS

| 3,994,589 | 11/1976 | Nodwell et al. | 356/156 |
| 4,729,036 | 3/1988 | Ikeda et al. | 358/296 |
| 4,945,220 | 7/1990 | Mallory et al. | 250/201.3 |
| 5,144,478 | 9/1992 | Toshimitsu | 359/392 |
| 5,392,094 | 2/1995 | Kudo | 355/67 |
| 5,530,518 | 6/1996 | Ushida et al. | 355/53 |

*Primary Examiner*—Edward L. Coles, Sr.
*Assistant Examiner*—Mark Wallerson
*Attorney, Agent, or Firm*—Ostrolenk, Faber, Gerb & Soffen, LLP

[57] ABSTRACT

A drum scanning type image reading apparatus includes an illumination optical system and an imaging optical system. The illumination optical system is an optical system for irradiating light upon an original. A variable aperture stop is disposed at a conjugate position with the original. In the imaging optical system, a pick-up lens focuses an image of an image reading region of the original on an image focusing surface, and photomultiplier tubes read light passing through one of holes which are formed in a main aperture plate which is disposed on the image focusing surface. To change an image reading resolution in the image reading apparatus, the image reading region and an illumination region are changed by changing the aperture size of the main aperture plate and the size of the variable aperture stop.

16 Claims, 14 Drawing Sheets

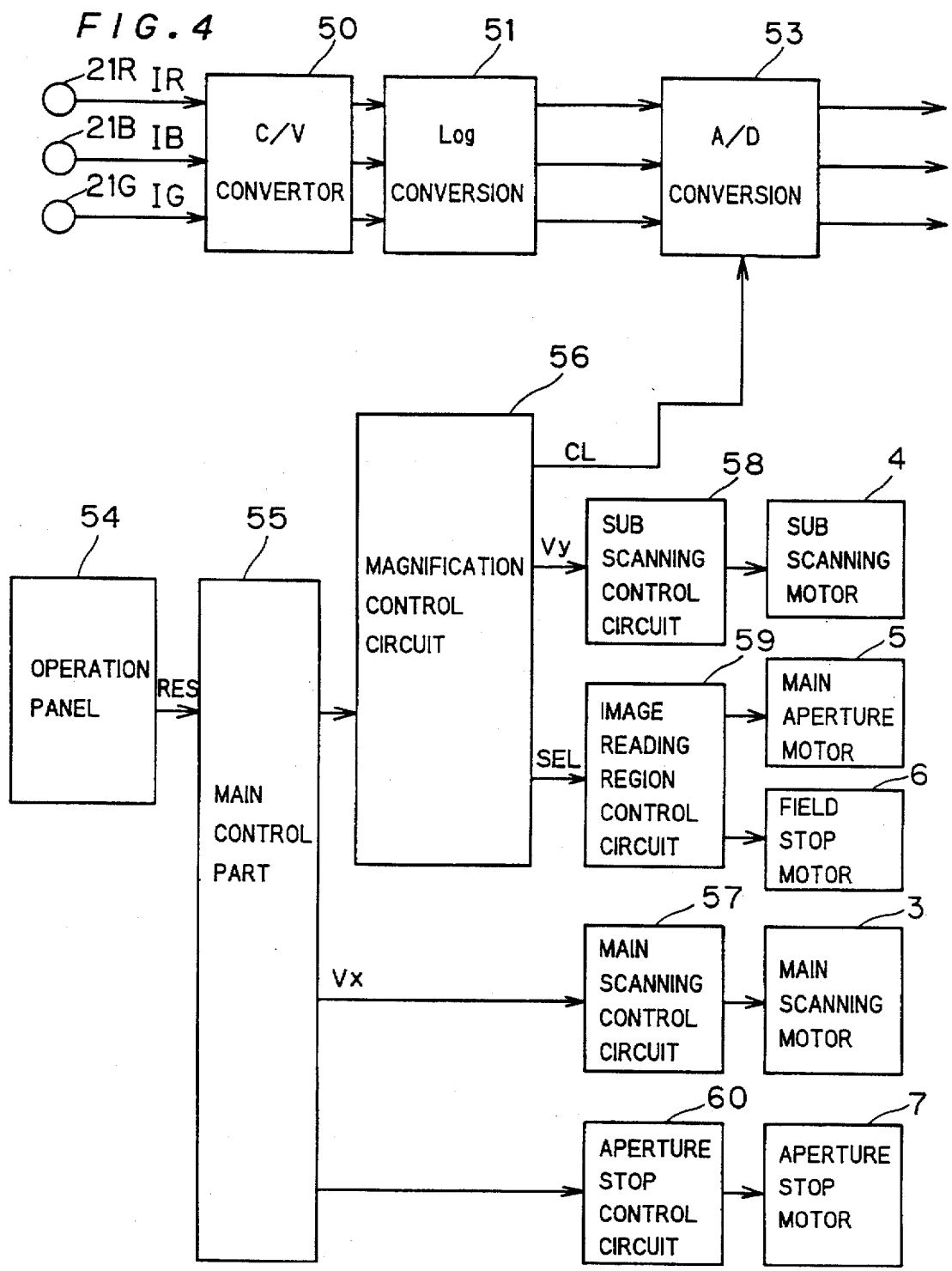

$$N_A = \sin\theta = \frac{d_A}{\sqrt{4 \cdot f_{49}^2 + d_A^2}}$$

HIGH ←—— IMAGE READING RESOLUTION ——→ LOW

IMAGE READING APPARATUS

BACKGROUND OF THE INVENTION

1. Field of the Invention

The present invention relates to an image reading apparatus which includes an illumination optical system for irradiating light upon an illumination region of an original and an imaging optical system for imaging light from an image reading region of the original on an image focusing surface.

2. Description of the Background Art

FIG. 13 is a view of an image reading apparatus according to a background technique of the present invention, more particularly, it shows an input scanning optical system of a scanning head. In FIG. 13, in the image reading apparatus, a pick-up lens (imaging lens) 103 which is mounted in the scanning head receives light from an original 102 which is pasted to a scanning drum 101, a real image of the original 102 is focused on a main aperture plate 104 in which a plurality of holes (or apertures) having different sizes are formed, and light passing through one of the holes (or apertures) of the main aperture plate 104 is allowed into a photomultiplier tube 105 and converted into an electric signal. When an image reading resolution needs be changed, an aperture diameter (i.e., aperture size) of the main aperture plate 104 is changed so that a desired image reading resolution is obtained.

It is necessary to illuminate the original 102 under a proper condition to read the original 102 using the image reading apparatus above. To this end, various types of illumination optical systems have been proposed and used in image reading apparatuses. Typically, a light source lamp 106, a collector lens 107 receiving light from the light source lamp 106, and a field stop 108 are arranged in this order in an illumination optical system. Through the collector lens 107 and the field stop 108, light from the light source lamp 106 is emitted into a ray pipe 111 which extends parallel to a rotation axis of the scanning drum 101.

An aperture stop 109 and a mirror 112 are arranged within the ray pipe 111. Incident light entering the ray pipe 111 passes through the aperture stop 109 and is then reflected by the mirror 112. Reflected light is then irradiated upon the original 102 which is mounted on the scanning drum 101, through a condenser lens 110 which is fixed to a surface of the ray pipe 111. The original 102 is irradiated in this manner.

The field stop 108 and the aperture stop 109 are fixed.

While rotating the scanning drum 101 in a main scanning direction X and at the same time moving the scanning head and the illumination optical system together as one unit in a sub scanning direction Y in synchronization with the rotation of the scanning drum 101, light from the original 102 is allowed into the photomultiplier tube 105, whereby photoelectrically converted electric signals are successively outputted.

When the image reading resolution for reading an original is changed, a diameter of an aperture which is formed in the main aperture plate 104 is changed and hence an image reading region AR on the original is changed, as shown in FIG. 14. However, since a diameter (size) of an aperture of the field stop 108 is fixed, an illumination region AE remains unchanged regardless of the image reading resolution. Although this causes no problem when the illumination region AE is slightly larger than image reading region AR, when the illumination region AE is substantially larger than image reading region AR (i.e., when the image reading resolution is high), light from a portion of the illumination region AE except for the image reading region AR may enter the photomultiplier tube 105 as flare. As a result, it is impossible to accurate read an image in a region where the image reading resolution is high.

Further, the apparatus shown in FIG. 13 has the following problem as well.

The numerical aperture of illumination light is changed by changing the diameter of the aperture (aperture size) of the aperture stop 109. For instance, when a surface of the original 102 is uneven or has a scratch or when the graininess of the original is rough, an image is read without affected by a scratch or the like, if the original is irradiated with illumination light which is diffused by increasing the numerical aperture. Conversely, when a surface of the original 102 is even or has no scratch or when the graininess of the original is fine, the image of the original can be read faithfully, if the numerical aperture of the illumination light is decreased and flare is prevented accordingly.

However, when the numerical aperture of the illumination light is adjusted, because of a change in a so-called Q factor (i.e., a value obtained by dividing a parallel density with a diffusion density), a measured density is changed depending on the numerical aperture. FIG. 15 is a graph showing a density characteristic. A density which is measured by a densitometer is along a horizontal axis, and a density which is measured by an image reading apparatus in which the numerical aperture of illumination light is adjustable is along a vertical axis.

A density which is measured by a densitometer coincides with a density which is measured by an image reading apparatus, when the numerical aperture of illumination light is sufficiently increased. Hence, the density measured by the densitometer under such a condition is used as a reference. In FIG. 15, in a medium density range in particular, the image reading apparatus tends to recognize the image denser as the numerical aperture is smaller. In short, as the numerical aperture is larger, the density which is measured by the image reading apparatus is closer to the density measured by the densitometer.

When the numerical aperture of the illumination light is adjusted, the image reading apparatus measures different densities even on the same original. Hence, it is impossible to stably read an image density.

SUMMARY OF THE INVENTION

The present invention is directed to an image reading apparatus for reading an image of an original. The apparatus includes: an illumination optical system for irradiating light upon an illumination region of the original; an imaging optical system for forming an image of an image reading region of the original on an image focusing surface, the image reading region included the illumination region; photoelectric conversion means for reading an image formed on the image focusing surface and outputting an image signal associated with the image; designating means for designating a change in an image reading resolution; image reading region changing means for changing the image reading region in accordance with an image reading resolution which is designated through the designating means; and illumination region changing means for changing the illumination region in accordance with the image reading resolution which is designated through the designating means.

Accordingly, it is an object of the present invention to provide for an image reading apparatus which reduces an influence of flare and therefore accurately reads an image, even if an image reading region is changed to change an image reading resolution.

It is another object of the present invention to provide for an image reading apparatus which stably reads an image even if the numerical aperture is changed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing a control operation performed in the image reading apparatus according to the present invention;

DESCRIPTION OF THE PREFERRED EMBODIMENTS

<Drum Scanning Type Image Recording Apparatus>

Figure 1:
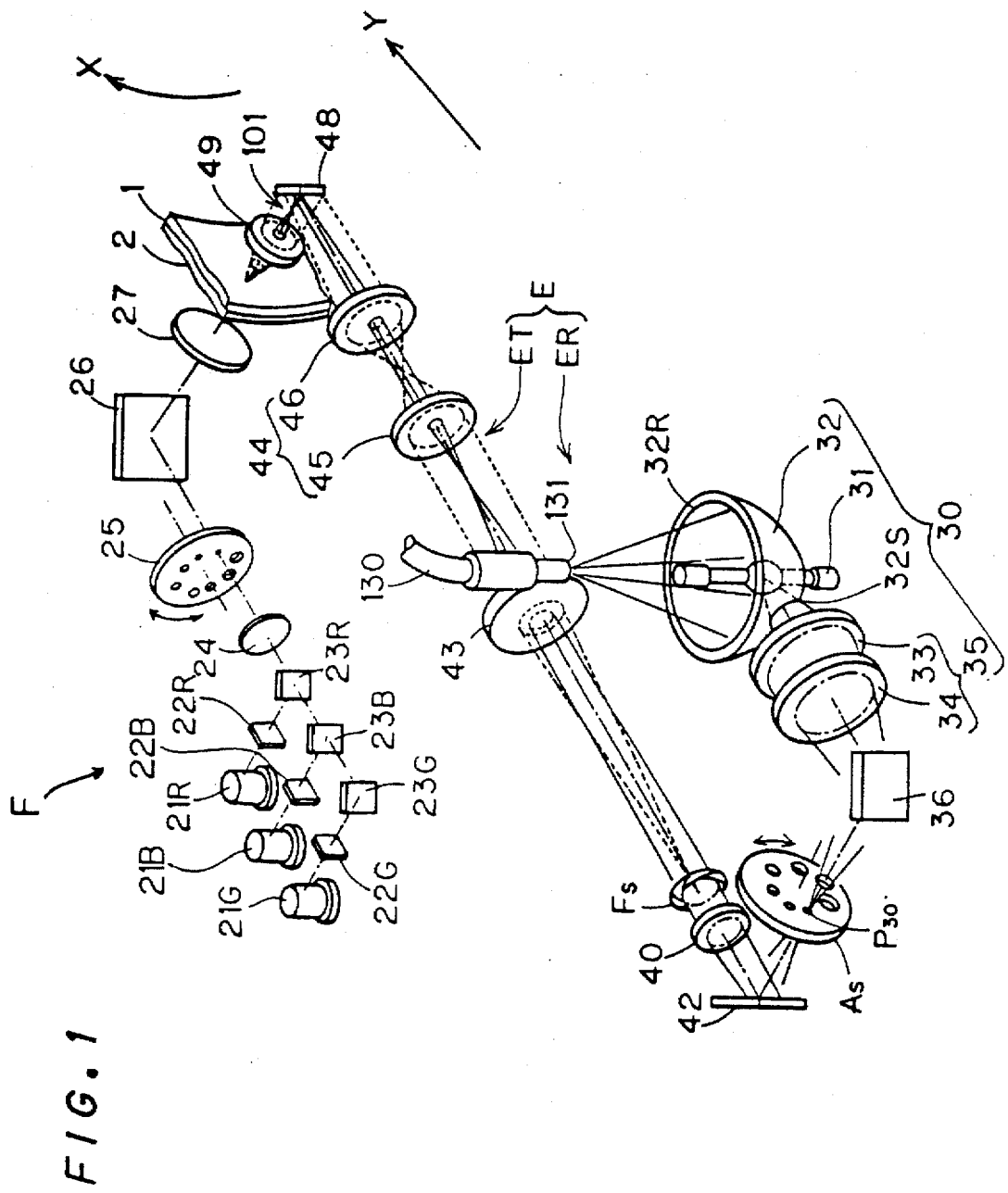
FIG. 1 is a perspective view of an illumination optical system and an imaging optical system of a drum scanning type image reading apparatus according to a preferred embodiment of the present invention.
Figure 2:
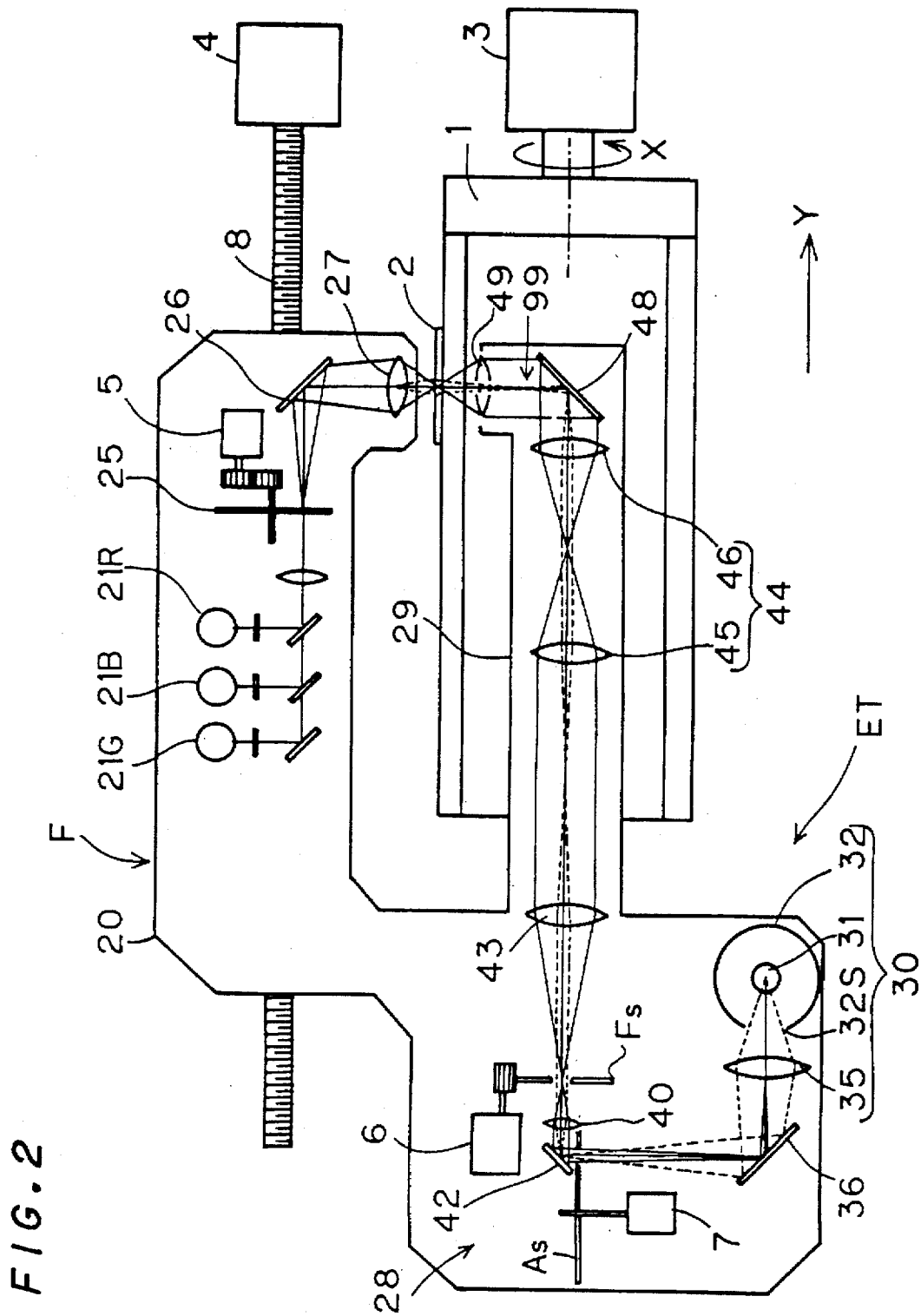
FIG. 2 is a schematic plan view of the illumination optical system and the imaging optical system of the drum scanning type image reading apparatus according to the present invention.

FIGS. 1 and 2 are a perspective view and a plan view, respectively, of an illumination optical system E and an imaging optical system F of a drum scanning type image reading apparatus according to a preferred embodiment of the present invention.

In FIG. 1, the illumination optical system E includes a transmission optical system ET for irradiating an original 2 which is mounted on a scanning drum 1 and a reflection optical system ER for irradiating the original 2 from an opposite side to the transmission optical system ET. The illumination optical system E (the transmission optical system ET and the reflection optical system ER) which will be described immediately below is also applicable to an apparatus for reading an image of an original 2 which is mounted on a transparency plane plate such as a glass plate.

In a lamp house 28 (See FIG. 2) of the transmission optical system ET, a light source 30 and a collector lens 40 are disposed. The lamp house 28 is linked to a ray pipe 29 which extends in a sub scanning direction Y. A field lens 43, a relay lens 44, a mirror 48 and a condenser lens 49 are arranged in the ray pipe 29.

In the light source 30, a perforated elliptical mirror 32 is disposed to surround a light source lamp 31 such as an xenon lamp and a halogen lamp, as shown in FIG. 1. Light from the light source lamp 31 is partially reflected by the elliptical mirror 32 to impinge upon the reflection optical system ER and irradiate the original 2. A hole 32S is formed in a side surface of the elliptical mirror 32 so that light from the light source lamp 31 partially passes through the hole 32S to be focused at a predetermined position $P_{30}$ by a secondary light source formation lens 35 which consists of two lenses 33 and 34, thereby forming a secondary light source. Denoted at 36 is a mirror for reflecting light from the secondary light source formation lens 35 so that light from the light source lamp 31 impinges upon the collector lens 40.

Thus, in the present preferred embodiment, the light source 30 is formed by the elements 31 to 35, and light from the light source lamp 31 is divided into two optical paths, one to impinge upon the reflection optical system ER and the other to impinge upon the transmission optical system ET. Further, in the present preferred embodiment, since light from the light source lamp 31 is divided by the perforated elliptical mirror 32 having such a structure described above in two directions which are perpendicular to each other, the light from the light source lamp 31 is spatially and effectively used.

A shutter is disposed (not shown) which is moved selectively onto either one of the optical paths, so that the transmission optical system ET is used when the original 2 is a transparency original, and the reflection optical system ER is used when the original 2 is a reflection type original.

In addition, the secondary light source formation lens 35 is formed by a focal optical system as shown in FIGS. 1 and 2 in the present preferred embodiment. Hence, the optical length is shorter and hence the light source 30 is smaller than where the secondary light source formation lens 35 is formed by an afocal optical system.

The collector lens 40 has such a structure that light from the light source 30 is converged and incident upon the field lens 43, as shown in FIG. 2.

Figure 3A:
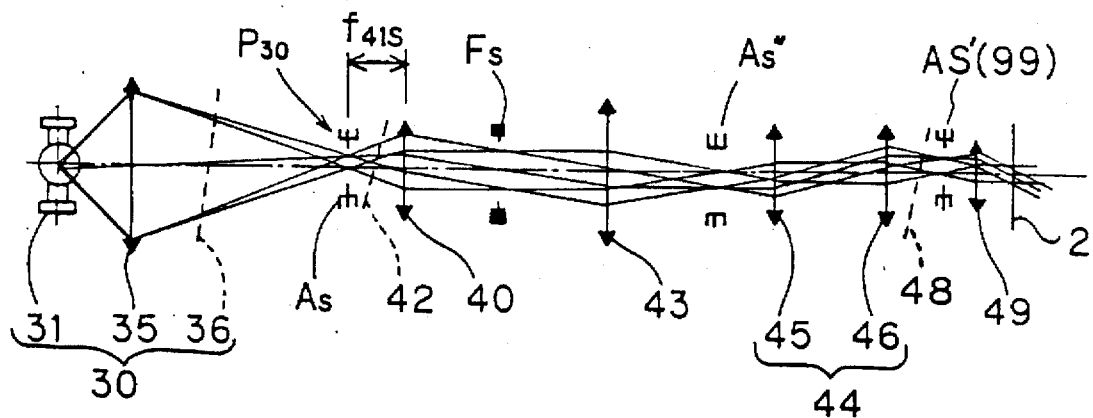
FIG. 3A is a view showing an optical structure of the illumination optical system of FIG. 1.

FIG. 3A is a view showing an optical structure of the transmission optical system ET. In this optical system ET, a variable aperture stop $A_S$ is disposed at the position $P_{30}$ at which the secondary light source is formed. The variable aperture stop $A_S$ includes a plurality of apertures which have different aperture sizes from each other. When an aperture stop motor 7 (See FIG. 2) is rotated a predetermined angle, the aperture size of the aperture stop is changed appropriately.

The collector lens 40 is located a focal length $f_{41S}$ of the collector lens 40 away from the secondary light source. The collector lens 40 receives light from the secondary light source on the mirror 42, and emits parallel light toward the field lens 43. Behind the collector lens 40, a variable aperture stop $F_S$ is disposed at a conjugate position with the original 2. The aperture diameter (or size) of the variable aperture stop $F_S$ is adjusted by a field stop motor 6 (See FIG. 2).

In the present preferred embodiment, a light source image of the light source lamp 31 is formed at a position of a pupil 99 of the condenser lens 49. The illumination optical system is therefore a Koehler illumination system.

Referring again to FIG. 1, a description will be given on a process in which light is emitted toward the collector lens 40 and irradiated upon the original 2. The emission light impinges upon the relay lens 44 through the field lens 43. Two lenses 45 and 46 forming the relay lens 44 are spaced apart from each other by a distance which is equal to the sum of focal lengths of the lenses 45 and 46, whereby a so-called afocal optical system is realized. When formed as an afocal optical system, the relay lens 44 is less influenced by a contamination or the like adhered on a lens surface than when formed as a focal optical system, and therefore, performs better relaying. That is, in a focal optical system, since a light source image (or a field stop image) is formed within or on the lens, a contamination or the like adhered on a lens surface of the lens disadvantageously disturbs the light source image (or the field stop image). In contrast, the relay system is formed by an afocal optical system as in the present preferred embodiment, since a light source image and a field stop image are formed in a space between lenses, the relay system transmits the light source image toward the condenser lens 49 transmits and the field stop image onto the original 2 without influenced by a contamination or the like adhered on a lens surface.

After reflected by the mirror 48, light from the relay lens 44 is converged by the condenser lens 49 to irradiate the original 2 which is mounted on the scanning drum 1 (See FIG. 2).

In the illumination optical system E having such a structure as above, an illumination region where the original 2 is irradiated is changed by adjusting the diameter (or size) of the aperture of the variable aperture stop $F_S$ which is positioned at a conjugate position with the original 2.

Now, the reflection optical system ER will be described with reference to FIG. 1. In FIG. 1, the reflection optical system ER is formed by a bundle fiber (optical guide means) 130 which guides light from the light source 30 near to the scanning drum 1. One end portion 131 of the bundle fiber 130 is located above the perforated elliptical mirror 32 to face an aperture portion 32R of the elliptical mirror 32 so that light from the aperture portion 32R impinges upon the bundle fiber 130 at the end portion 131. After transmitted to the other end portion (not shown), the light is emitted from the other end portion toward the original 2. The original 2 is irradiated using the reflection optical system in this manner.

As shown in FIGS. 1 and 2, the imaging optical system F includes a main aperture plate 25 and a pick-up lens (imaging lens) 27 which focuses an image of the original 2 on the main aperture plate 25. The main aperture plate 25 is located on an image focusing surface on which the pick-up lens 27 focuses an image of the original 2. A plurality of holes (apertures) having different diameters from each other are formed in the main aperture plate 25, as in the variable aperture stop $A_S$ of the illumination optical system described earlier. One of the holes (apertures) is selected using a main aperture motor 5 (See FIG. 2), and the main aperture plate 25 is rotated so that the selected hole is positioned on an optical axis of the pick-up lens 27. Light passing through the hole (aperture) formed in the main aperture plate 25 is converted into a bundle of parallel rays by a collimator lens 24, separated into three primary colors by two dichroic mirrors 23R and 23B and a mirror 23G, and then guided into photomultiplier tubes 21R, 21B and 21G each serving as a photoelectro transducer through color filters 22R, 22b and 22G, respectively.

In the imaging optical system F having such a structure as above, an image reading region is changed by changing the aperture diameter (or size) of the main aperture plate 25.

Figure 5A:
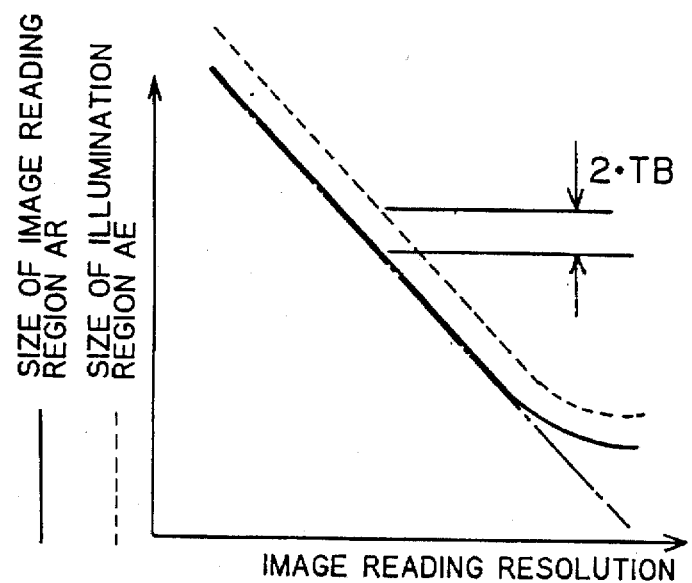
FIG. 5A is a view showing changes in an illumination region and an image reading region in accordance with a change in an image reading resolution.
Figure 5B:
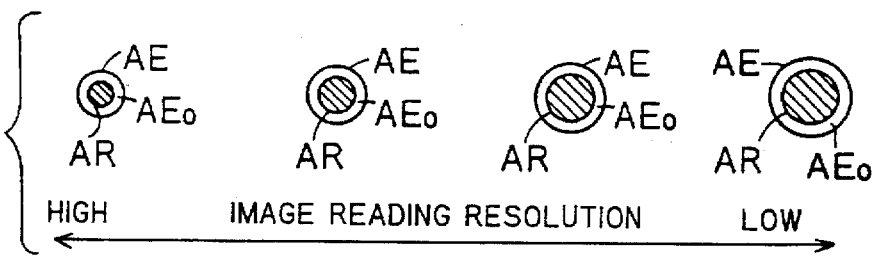
FIG. 5B is a graph showing a relationship between the illumination region and the image reading region.
Figure 5C:
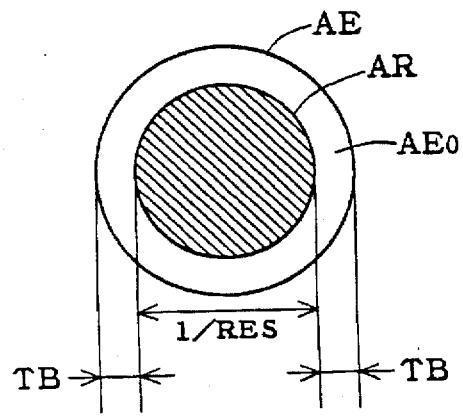
FIG. 5C is a view showing a relationship between the illumination region and the image reading region.

To change an image reading resolution in the image reading apparatus which includes the illumination optical system E and the imaging optical system F as above, the illumination region on the original 2 is adjusted by adjusting the variable aperture stop $F_S$ and the image reading region is adjusted by adjusting the aperture diameter (or size) of the main aperture plate 25. FIGS. 5A, 5B and 5C show a relationship between the illumination region and the image reading region.

As shown in FIGS. 5A and 5B, the image reading region AR is determined by the image reading resolution, and the size of the image reading region AR corresponds to an inverse number of the image reading resolution. Since the entire image reading region must be irradiated with light, the illumination region AE must cover the entire image reading region AR. Further, to suppress an influence of flare to minimum, it is necessary to reduce an illumination region $AE_0$ except for the image reading region AR as much as possible. Hence, it is preferable that the illumination region AE perfectly coincides with the image reading region AR. However, it is difficult to perfectly coincide the illumination region AE with the image reading region AR because of an accuracy of mechanically positioning the aperture plate 25, the aperture stop $F_S$ and the like which are included in the illumination optical system E and the imaging optical system F.

As shown in FIG. 5C, when the illumination region AE is formed larger than the image reading region AR, regardless of the image reading resolution, by twice a displacement TB which is calculated by adding a tolerable displacement of positioning the image reading region AR to a tolerable displacement of positioning the illumination region AE, the illumination region AE completely covers the image reading region AR while the illumination region $AE_0$ except for the image reading region becomes small, regardless of a mechanical positioning displacement which is created when the optical systems are assembled. Hence, it is possible to faithfully read a density of the original 2 and suppress an influence of flare to minimum.

Regardless of the image reading resolution, a positional displacement between the illumination region AE and the image reading region AR remains approximately constant because of such a mechanical positioning displacement. Hence, a ratio of the illumination region AE to the image reading region AR is larger at a high image reading resolution side than at a low image reading resolution side.

A relationship between the image reading resolution and the aperture diameter of the aperture plate 25 is expressed as:

$$d = M/RES \tag{1}$$

where the image reading resolution is RES, the aperture diameter is d, and a magnification of the pick-up lens (imaging lens) 27 is M. Hence, assuming that the magnification M is constant, it is only necessary to change the aperture diameter d in inverse ratio to the image reading resolution.

However, when the image reading resolution is relatively high, it is sometimes impossible to form the aperture of the aperture plate 25 in such a size that satisfies the equation (1) above, due to a processing constraint. When such is the case, the image reading region AR may be formed slightly larger only at the high image reading resolution side and the illumination region AE may be formed accordingly larger as shown in FIG. 5B. Since this ensures that an area wider than the ideal image reading region is read, an outputted density is an image signal which is slightly more smoothed out than an accurate image signal. However, such a minor difference is not very much influential.

Therefore, when the illumination region AE is adjusted to be slightly larger than the image reading region AR, the illumination region $AE_0$ except for the image reading region AR does not become very large even if the image reading resolution is changed. This reduces an adverse influence of flare.

FIG. 4 is a block diagram showing a control operation performed in the image reading apparatus which includes the illumination optical system E and the imaging optical system F as above.

Basically, the image reading apparatus is controlled by a main control part 55 which is formed by a microcomputer or the like. The main control part 55 consists of a CPU, a ROM, a RAM, etc. In the main control part 55, the CPU controls loads based on a control program which is stored in the ROM, control data which are stored in the RAM, and information inputted through an operation panel 54.

Current values of image signals IR, IB and IG outputted respectively from the photomultiplier tubes 21R, 21B and 21G are converted into voltage values by a current/voltage convertor 50, further converted into logarithms by a LOG conversion circuit 51, and thereafter converted into digital data by an A/D conversion circuit 53. The A/D conversion circuit 53 receives a sampling clock CL based on which A/D conversion is performed. Hence, by adjusting a frequency of the sampling clock CL, the image reading resolution is changed in the main scanning direction X. For example, when the frequency of the sampling clock CL is multiplied N times, the image reading resolution is increased N times.

When an operator inputs the image reading resolution RES on the operation panel (designating means) 54 which is formed by a key board or the like, the main control part 55 supplies data regarding the image reading resolution RES to a magnification control circuit 56. The magnification control circuit 56 controls a rotation speed of a sub scanning motor 4 and quantities of rotation of the main aperture motor 5 and the field stop motor 6, to thereby set a sub scanning speed $V_y$, the aperture diameter of the aperture plate 25 and the aperture diameter of the aperture stop $F_S$ each at a value which is suitable to the image reading resolution RES.

Further, the magnification control circuit 56 provides an A/D conversion circuit 52 with the sampling clock CL which has a frequency which is appropriate to the image reading resolution RES.

For instance, the sub scanning speed $V_y$ (mm/sec) is expressed as:

$$V_y \text{ (mm/sec)} = 1/(RES \cdot T) \tag{2}$$

where the image reading resolution is RES (line/mm), a radius of the scanning drum 1 is r (mm), and a rotation cycle of the scanning drum 1 is T (sec). The frequency $f_{CL}$ of the sampling clock CL is expressed as:

$$f_{CL} = 2\pi r/(RES \cdot T) \tag{3}$$

The magnification control circuit 56 outputs data regarding the sub scanning speed $V_y$ to a sub scanning control circuit 58 so that the sub scanning motor 4 is driven at the sub scanning speed $V_y$. Further, the magnification control circuit 56 provides an image reading control circuit 59 with a selector signal SEL which changes in accordance with the image reading resolution RES. The image reading control circuit 59 includes a memory which stores the relationship between the image reading region AR and the illumination region AE which is shown in FIG. 5. Based on the relationship which is stored, the main aperture motor 5 and the field stop motor 6 are driven. The speed of a main scanning motor 3 is controlled through a main scanning control circuit 57 so that the scanning drum 1 rotates at a constant peripheral velocity $V_X$ regardless of the image reading resolution. In addition, an aperture stop control circuit 60 controls the aperture stop motor 7 so that a variable aperture stop $A_S$ is adjusted in accordance with information which are supplied through the operation panel 54. The aperture size of the variable aperture stop $A_S$ is set large when an original includes a scratch or is uneven but set small when a density needs be read more accurately.

In this manner, light from the original 2 is guided into the photomultiplier tubes 21R, 21B and 21G and an image of the original 2 is photoelectrically converted, while rotating the scanning drum 1 in the main scanning direction X and moving a scanning head 20 which includes the imaging optical system F and the illumination optical system E in a sub scanning direction Y in synchronization with the rotation of the scanning drum 1, whereby the image of the original 2 is read.

As described above, in the present preferred embodiment, the image reading region AR on an original is changed by means of the imaging optical system F in accordance with a change in the image reading resolution, and further, the illumination region AE is changed by means of the illumination optical system E. Hence, the illumination region AE will never be excessively larger than the image reading region AR, and therefore, light impinging upon photoelectric elements such as the photomultiplier tubes 21R, 21B and 21G is less influenced by flare. This makes it possible to accurately read an image signal.

As shown in FIG. 3A, in the present preferred embodiment, the field lens 43 and the condenser lens 49 are arranged so as to form an afocal optical system. The afocal relay lens 44 is disposed between the field lens 43 and the condenser lens 49. Further, since the collector lens 40 is spaced away from the secondary light source by the focal length of the collector lens 40 as described above, the transmission optical system ET is telecentric on the image side. This makes it possible to better irradiate the original 2.

Although the present invention has been described in relation to the preferred embodiment above, the present invention is not limited to this particular preferred embodiment. Rather, the present invention can be modified in a variety of manners.

In the preferred embodiment above, the image reading region AR defined by the imaging optical system F is changed by adjusting the aperture diameter of the aperture plate 25. Instead, the aperture diameter of the aperture plate 25 may be fixed and the pick-up lens (imaging lens) 27 may be formed by a zoom lens so that the image reading region AR is changed by changing a magnification of the zoom lens.

Further, although the preferred embodiment above uses the condenser lens 49 as a part of the illumination optical system E which is shown in FIG. 3A, a zoom lens may be used instead. When such modification is implemented, the illumination region is changed in a similar manner to that in the preferred embodiment described above, by changing a magnification of the zoom lens while fixing the size of the aperture stop $F_S$. Similar modification is possible in structures as those shown in FIGS. 3B and 3C as well which will be described later.

Still further, although the preferred embodiment above arranges the variable aperture stop $A_S$ at a position where the secondary light source is formed, the variable aperture stop $A_S$ may be disposed at any other position as far as disposed at the light source image or a position which is conjugate with the light source image. If located at the position $P_{30}$ where the secondary light source is formed as described above, the variable aperture stop $A_S$ is positioned within the lamp house 28. This makes it easier to incorporate an automatic adjusting mechanism (e.g., a driving source, a driving force transmitting part) which automatically changes the aperture size of the variable aperture stop $A_S$. Meanwhile, when the aperture stop is disposed at a position which is conjugate with the light source image and which is closest to the original 2 (i.e., at the position of the pupil ($A_{S'}$) of the condenser lens 49 in the preferred embodiment above), it is possible to suppress an influence of vibration of the ray pipe 29 or other influence as much as possible, so that the original 2 is irradiated stably.

Although the transmission optical system ET is a so-called Koehler illumination system in the preferred embodiment above, the transmission optical system ET may be formed by a critical illumination system, by adjusting distances between the respective optical elements but without changing the basic elements. The effect created remains the same as where the transmission optical system ET is formed by a Koehler illumination system.

Figure 3B:
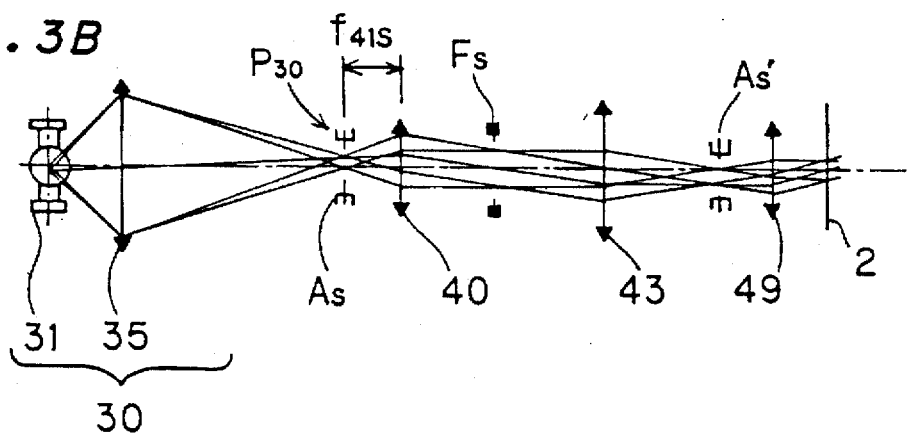
FIG. 3B is a view showing an optical structure of an illumination optical system according to other preferred embodiment of the present invention.
Figure 3C:
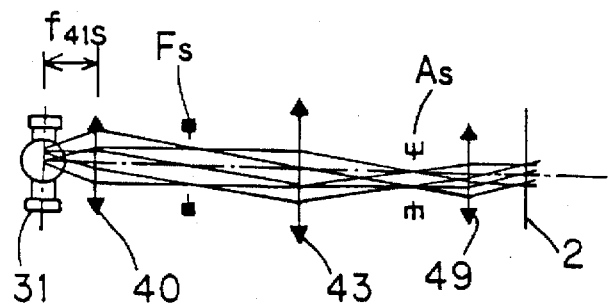
FIG. 3C is a view showing an optical structure of an illumination optical system according to still other preferred embodiment of the present invention.

Although the transmission optical system ET includes the relay lens 44 in the preferred embodiment above, the relay lens 44 is not an essential element in the present invention. Rather, the transmission optical system ET may be formed without the relay lens 44 included as shown in FIG. 3B, while preserving a similar effect to that created in the drum scanning type image reading apparatus according to the preferred embodiment above. When the transmission optical system ET is formed not to include the relay lens 44, the variable aperture stop $A_S$ may be disposed at the position $A_S$ where the light source image is formed as in FIG. 3A or at the position of the pupil ($A_{S'}$) of the condenser lens 49. In addition, the light source lamp 31 may be disposed at the position of the secondary light source which is used in the preferred embodiment above, as shown in FIG. 3C. When the light source lamp 31 is disposed as such, the aperture stop $A_S$ may be disposed at the position of the pupil ($A_{S'}$) of the condenser lens 49.

In the preferred embodiment above, the image reading resolution in the main scanning direction X is determined by adjusting the frequency of the sampling clock CL. However, the frequency of the sampling clock CL may be fixed constant, and the rotation speed $V_X$ of the scanning drum 1 may be adjusted to determine the image reading resolution in the main scanning direction X. Alternatively, the image reading resolution in the main scanning direction X may be determined by adjusting both the sampling clock and the rotation speed $V_X$ of the scanning drum. In this case, however, the equations (2) and (3) above must be satisfied as in the preferred embodiment above.

<Flat Bed Scanning Type Image Reading Apparatus>

Figure 6:
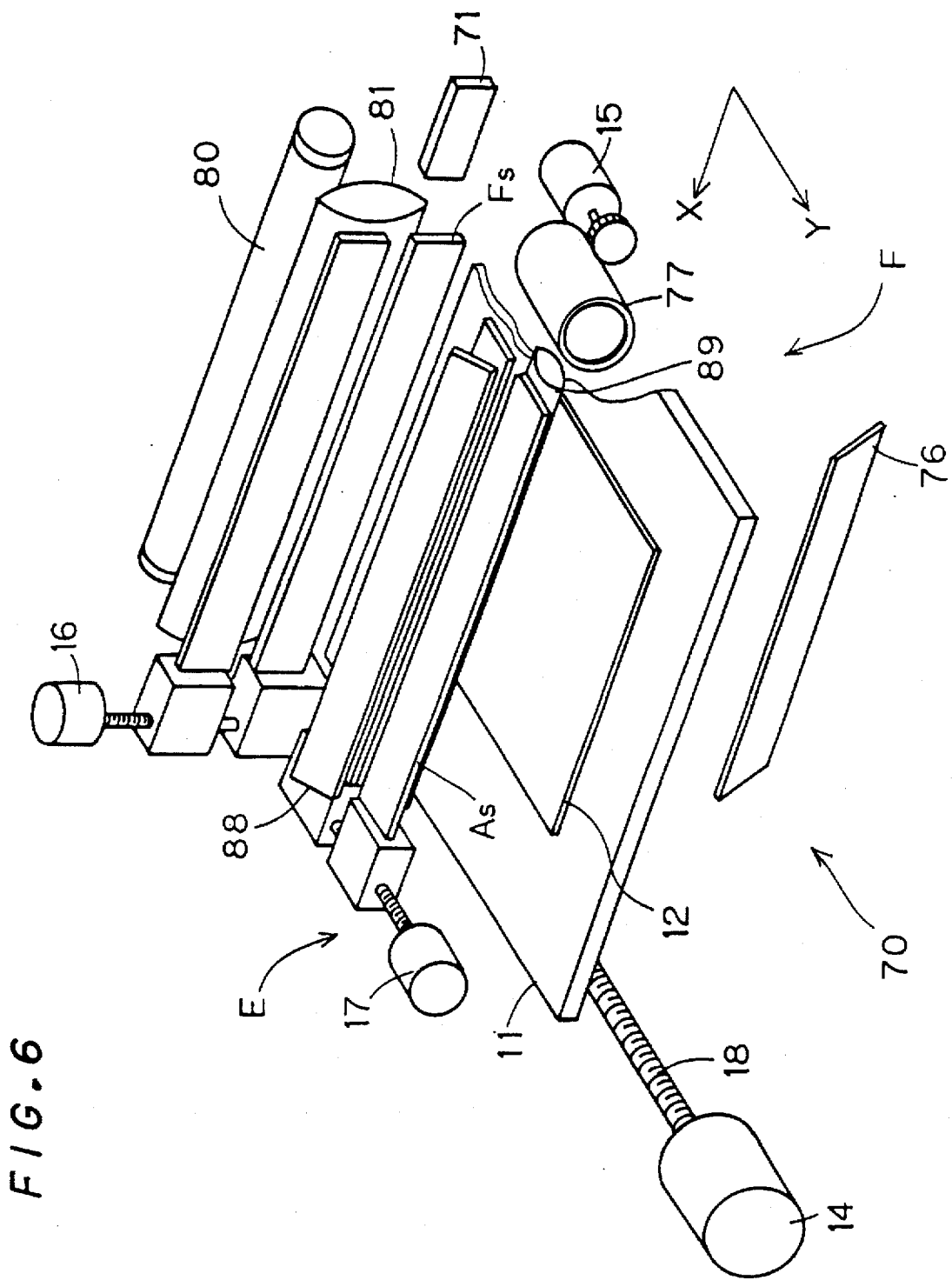
FIG. 6 is a perspective view of an illumination optical system and an imaging optical system of a flat bed scanning type image reading apparatus according to a preferred embodiment of the present invention.
Figures 7A, 7B:
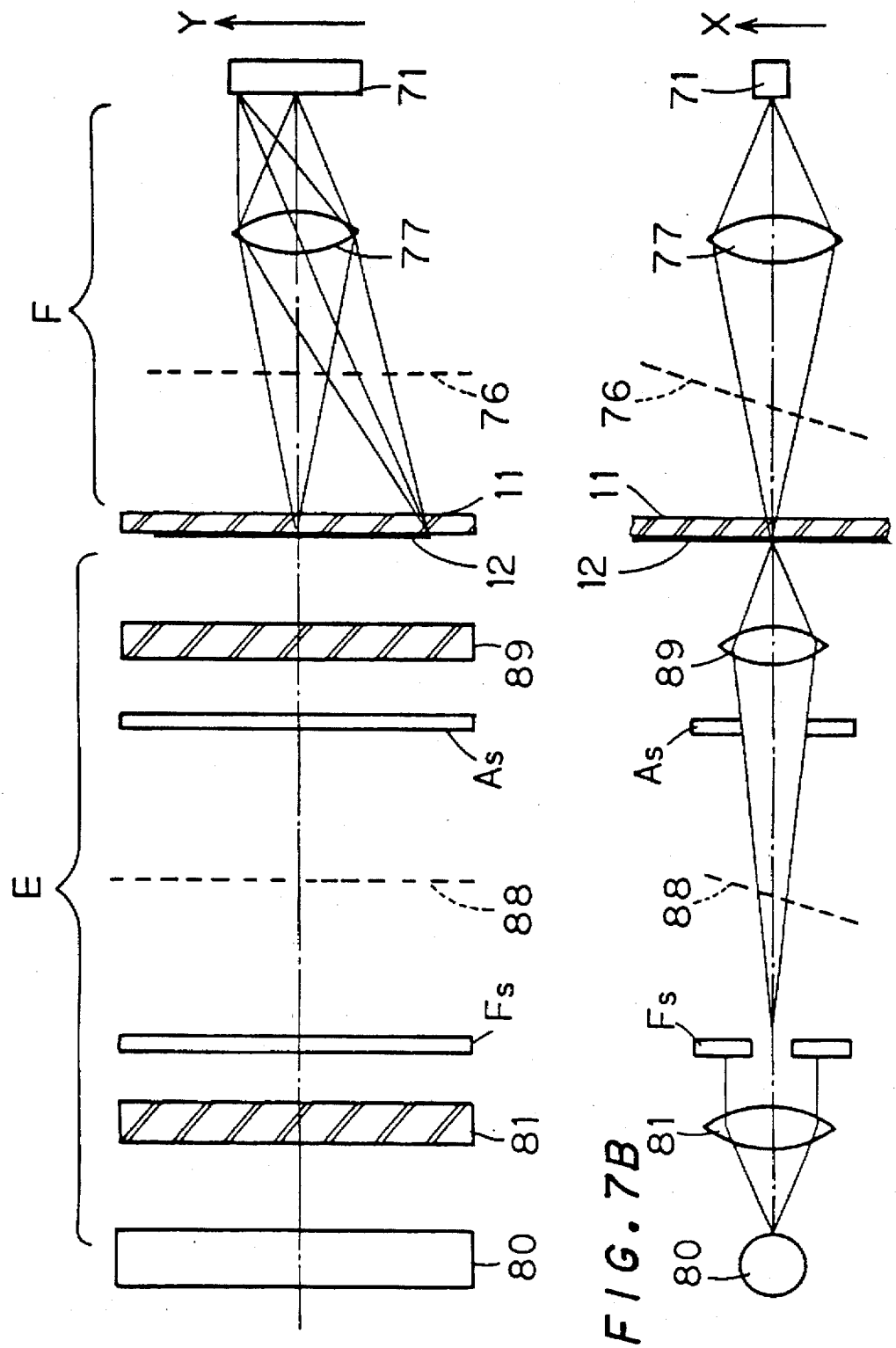
FIG. 7A is a horizontal cross sectional view of the flat bed scanning type image reading apparatus.
FIG. 7B is a vertical cross sectional view of the flat bed scanning type image reading apparatus.

FIGS. 6, 7A and 7B are a perspective view and plan views, respectively, of an illumination optical system E and an imaging optical system F of a flat bed scanning type image reading apparatus according to other preferred embodiment of the present invention. FIGS. 7A and 7B show a cross section taken in the main scanning direction X and a cross section taken in the sub scanning direction Y, respectively. This flat bed scanning type image reading apparatus is the same in basic principle and structure as the drum scanning type image reading apparatus described earlier, except for that the image reading region is in the shape of a slit rather than in the shape of a spot.

As shown in FIG. 6, the image reading apparatus includes the illumination optical system E for irradiating an original 12 which is mounted on an original mounting member 11 and the imaging optical system F for reading an image of the original.

In the illumination optical system E, a linear light source 80 which is formed by a fluorescent lamp, a collector lens 81 which is formed by a cylindrical lens, a variable aperture stop $F_S$, a mirror 88, the variable aperture stop $A_S$, and a condenser lens 89 which is formed by a cylindrical lens are arranged in this order. The variable aperture stop $F_S$ is located at an optically conjugate position with the original 12 with respect to the condenser lens 89. The variable aperture stop $A_S$ is located at a front focal point of the condenser lens 89. In the illumination optical system E, an illumination region on the original 12 is adjusted when the slit width (size) of the variable aperture stop $F_S$ is adjusted.

In the imaging optical system F, a mirror 76, a zoom lens (imaging lens) 77, and a line sensor 71 which serves as a photoelectric element are arranged in this order. The line sensor 71 is a sensor which is formed by a CCD or the like, for instance, and is located at an image focusing surface, i.e., an optically conjugate position with zoom lens 77. Hence, it is possible to read a liner image on the original 12 with the line sensor 71.

To change an image reading resolution in the imaging optical system F, with respect to the main scanning direction X, an imaging magnification of the zoom lens 77 is adjusted using a magnification change motor 15, so that a magnification at which an image is focused for imaging on the line sensor 71 is changed. With respect to the sub scanning direction, as in the drum scanning type image reading apparatus described earlier, the image reading resolution is changed by adjusting a relative speed (i.e., sub scanning speed) between the original 12 and an optical system 70 which includes the imaging optical system F and the illumination optical system E.

Figure 8:
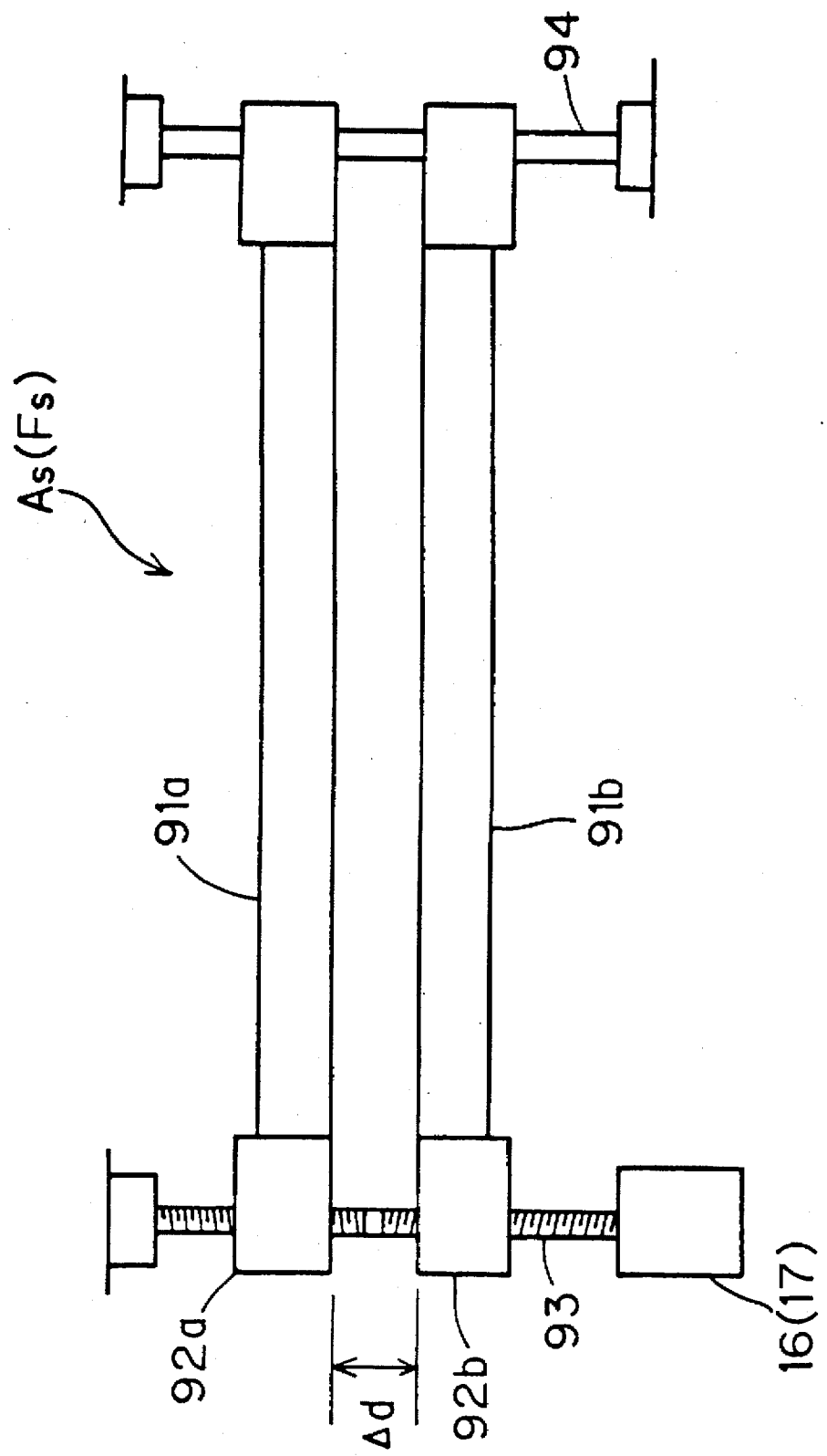
FIG. 8 is a front view showing a structure of a field stop and an aperture stop.

FIG. 8 is a plan view of the variable aperture stop $F_S$. When driven by a field aperture motor 16, the variable aperture stop $F_S$ adjusts a slit size $\Delta d$ which is defined by a pair of slit plates 91a and 91b. Blocks 92a and 92b are fixed to the both ends of the slit plates 91. A screw 93 penetrates the blocks 92 on one side, and a rail 94 penetrates the blocks 92 on the other side. The screw 93 is threaded in opposite directions in an upper portion and a lower portion. Hence, when the screw 93 is rotated, the slits 91a and 91b are moved in opposite directions to each other. Therefore, the slit size $\Delta d$ is adjusted by rotating the field aperture motor 16. The variable aperture stop $A_S$ has the same structure as this variable aperture stop. When an aperture stop motor 17 is rotated, the slit size of the variable aperture stop $A_S$ is changed.

Figure 9:
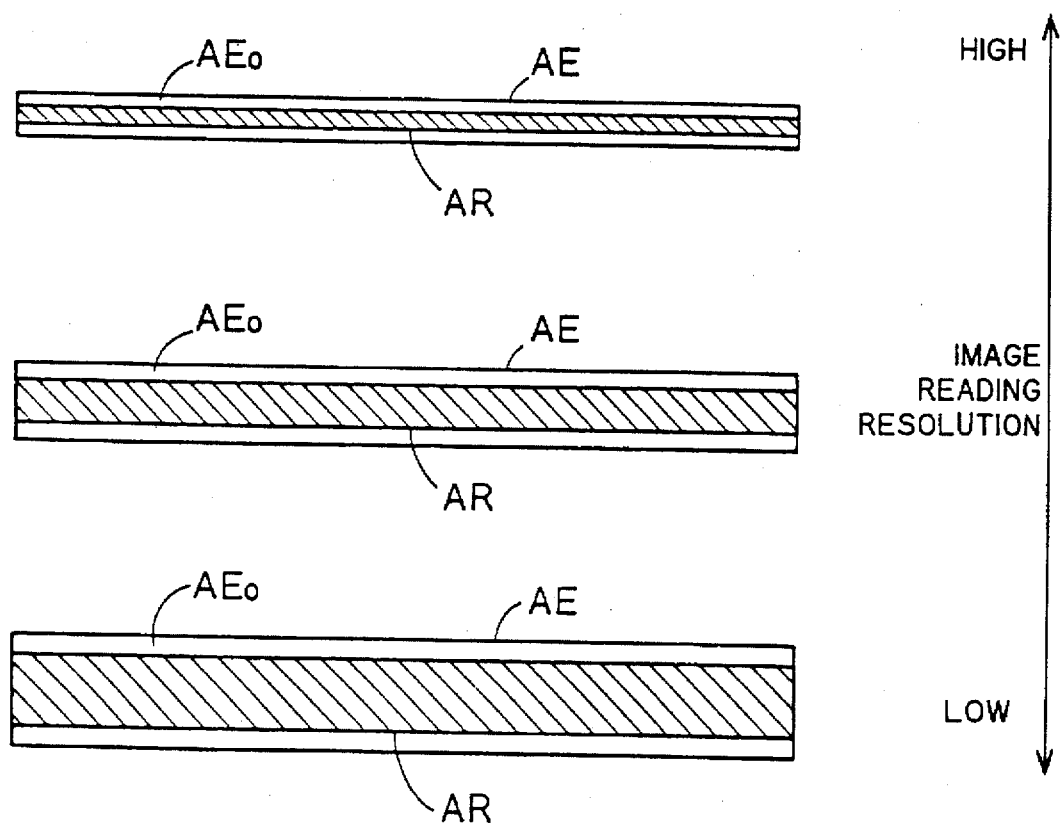
FIG. 9 is a view showing a relationship between an illumination region and an image reading region.

To change the image reading resolution in the image reading apparatus which includes the illumination optical system E and the imaging optical system F as described above, the illumination region on the original 12 is changed when the slit size of the variable aperture stop $F_S$ is adjusted. FIG. 9 shows a relationship between the illumination region and the image reading region. In FIG. 9, the illumination region AE is adjusted so as to be slightly larger than the image reading region AR. As in the drum scanning type image reading apparatus described earlier, the illumination region AE is formed larger by a size which corresponds to a mechanical displacement which is created during assembling of the illumination optical system E and the imaging optical system F. Further, with respect to the sub scanning direction Y, a ratio of the illumination region AE to the size of the image reading region AR in the sub scanning direction Y is larger at the high image reading resolution side than at the low image reading resolution side. Since the illumination region AE always completely covers the illumination region AE even if the image reading resolution is changed while the illumination region $AE_0$ except for the image reading region AR does not become very large, it is possible to accurately read an image signal.

Since a block diagram showing a control operation performed in such a flat bed scanning type image reading apparatus must be approximately the same as the block diagram showing the control operation performed in the drum scanning type image reading apparatus, a redundant block diagram will be simply omitted. It is to be noted however that the frequency of the sampling clock CL does not have to be changed unlike in FIG. 4, since the zoom lens 77 optically changes the magnification in the main scanning direction X.

As described above, according to this preferred embodiment, it is possible to change the image reading region AR which is created by the imaging optical system F and the illumination region AE which is created by the illumination optical system E in accordance with a change in the image reading resolution in the flat bed scanning type image reading apparatus as well which includes the line sensor 71. Since it is possible to set the illumination region AE which is suitable to the image reading region AR, an adverse influence of flare is reduced.

The numerical aperture is adjustable in either one of the image reading apparatuses described above. To be more specific, in the image reading apparatus shown in FIG. 1, the variable aperture stop $A_S$, in which a plurality of holes (or apertures) which have different aperture sizes (aperture diameters) from each other are formed, is rotated a predetermined angle by the aperture stop motor 7, whereby the aperture size (aperture diameter) of the aperture stop is appropriately changed and hence the numerical aperture of illumination light which is irradiated upon the original 2 is adjusted. On the other hand, in the image reading apparatus shown in FIG. 6, the aperture stop motor 17 is rotated so that the slit width (aperture size) of the variable aperture stop $A_S$ is changed and hence the numerical aperture of illumination light is adjusted. Thus, the both apparatuses are characterized in that they can accurately read an image even when the image reading region is changed. However, due to a change in the Q factor which is created by adjusting the numerical aperture, a measured density disadvantageously changes depending on the numerical aperture. Now, a technique for solving this problem will be described below. The technique is applicable to both the drum scanning type image reading apparatus shown in FIG. 1 and the flat bed scanning type image reading apparatus shown in FIG. 6.

Figure 10:
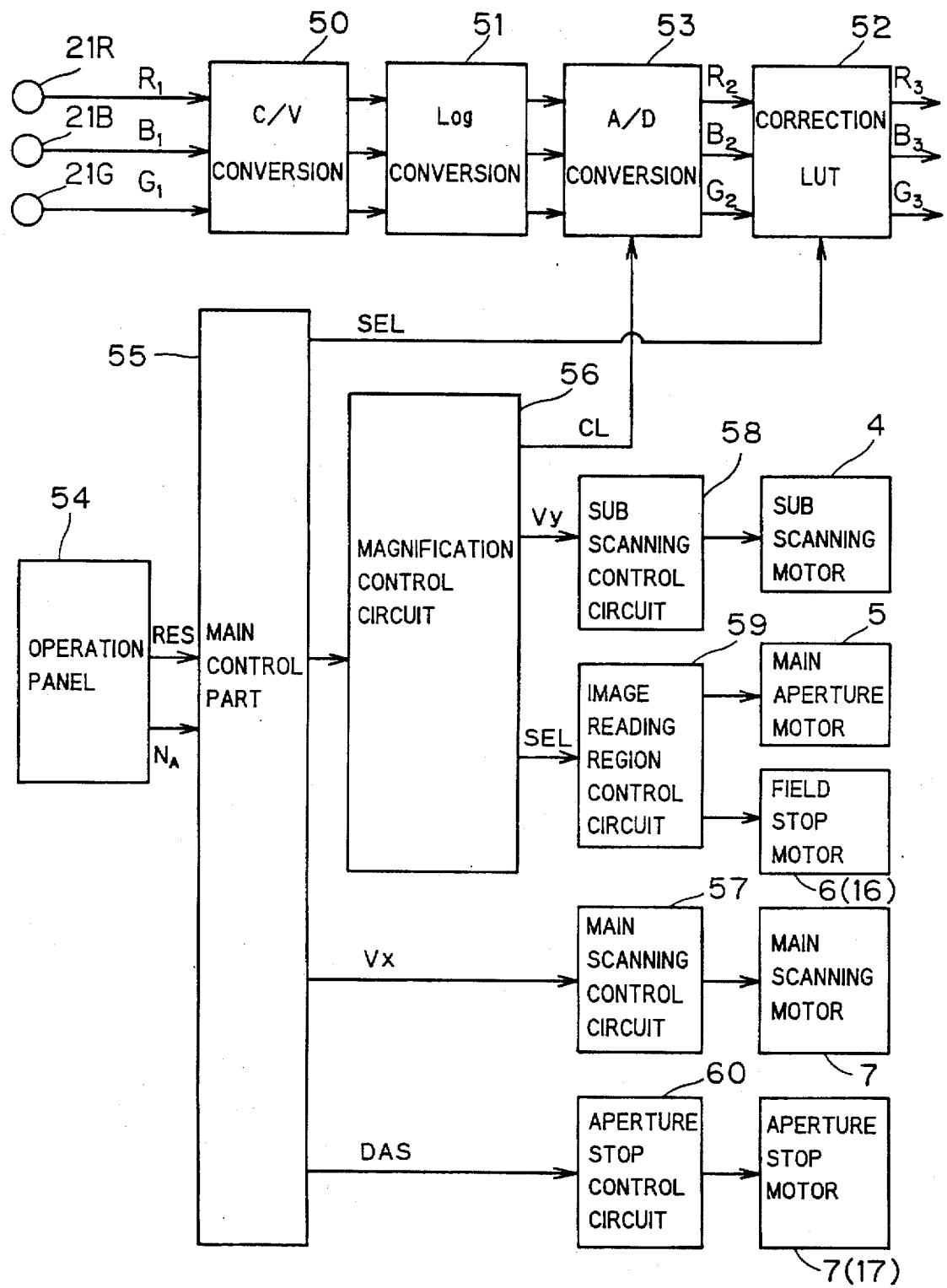
FIG. 10 is a block diagram showing a control operation performed in an improved image reading apparatus according to the present invention.

FIG. 10 is a block diagram showing a control operation performed in an improved image reading apparatus according to the present invention. The illustrative improved image reading apparatus has the same mechanical and optical structure as the image reading apparatuses described above (FIGS. 1 and 6), and therefore, a redundant description will be omitted.

The image reading apparatus is controlled basically by the main control part 55 which is formed by a microcomputer or the like. The main control part 55 consists of a CPU, a ROM, a RAM, etc. The CPU controls loads based on a control program which is stored in the ROM, control data which are stored in the RAM and information inputted through an operation panel 54.

Image signals $R_1$, $B_1$ and $G_1$ outputted respectively from the photomultiplier tubes 21R, 21B and 21G are converted into voltage values by the current/voltage convertor 50, further converted into logarithms by the LOG conversion circuit 51, and thereafter converted into digital data by the A/D conversion circuit 53. The A/D conversion circuit 53 receives the sampling clock CL based on which A/D conversion is performed. Hence, by adjusting the frequency of the sampling clock CL, the image reading resolution is changed in the main scanning direction X. For example, when the frequency of the sampling clock CL is multiplied N times, the image reading resolution is increased N times.

Figure 11:
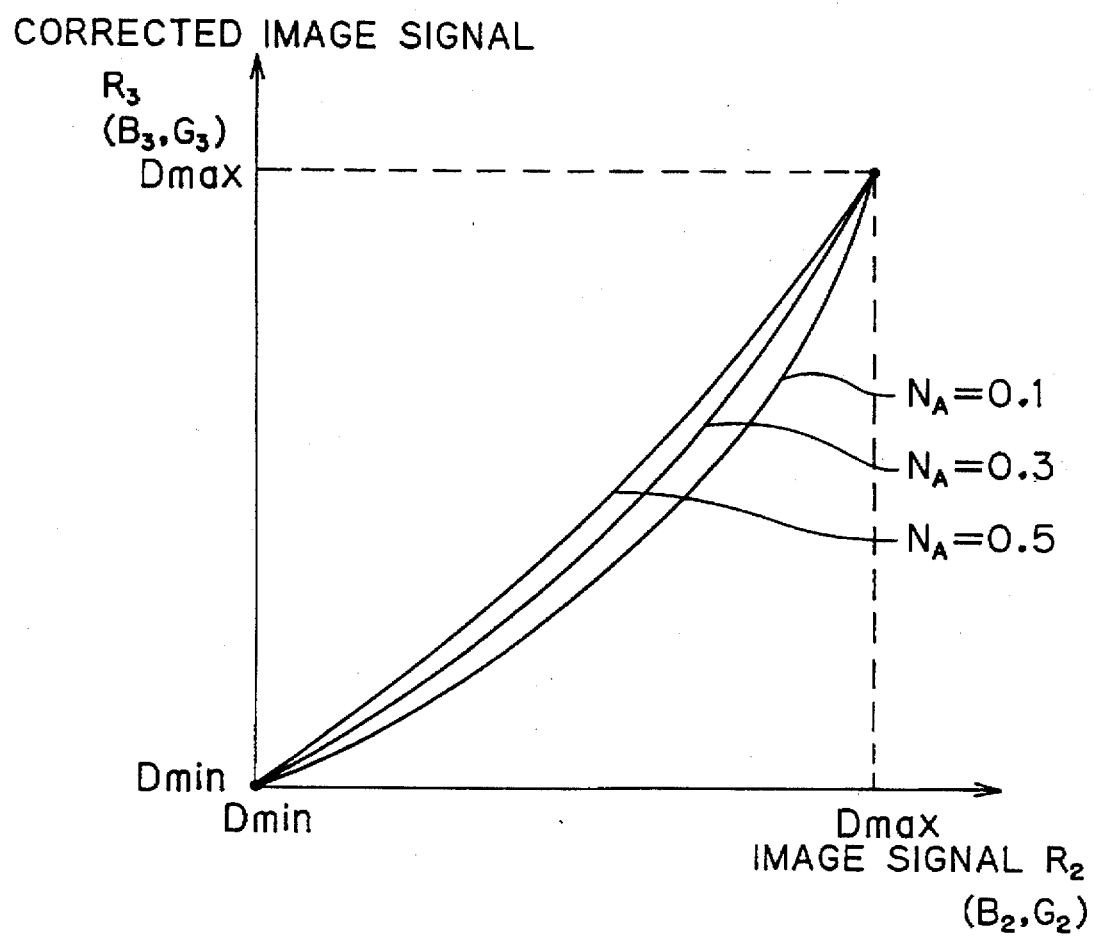
FIG. 11 is a view showing a relationship between an aperture diameter of a variable aperture stop and the numerical aperture.
Figure 15:
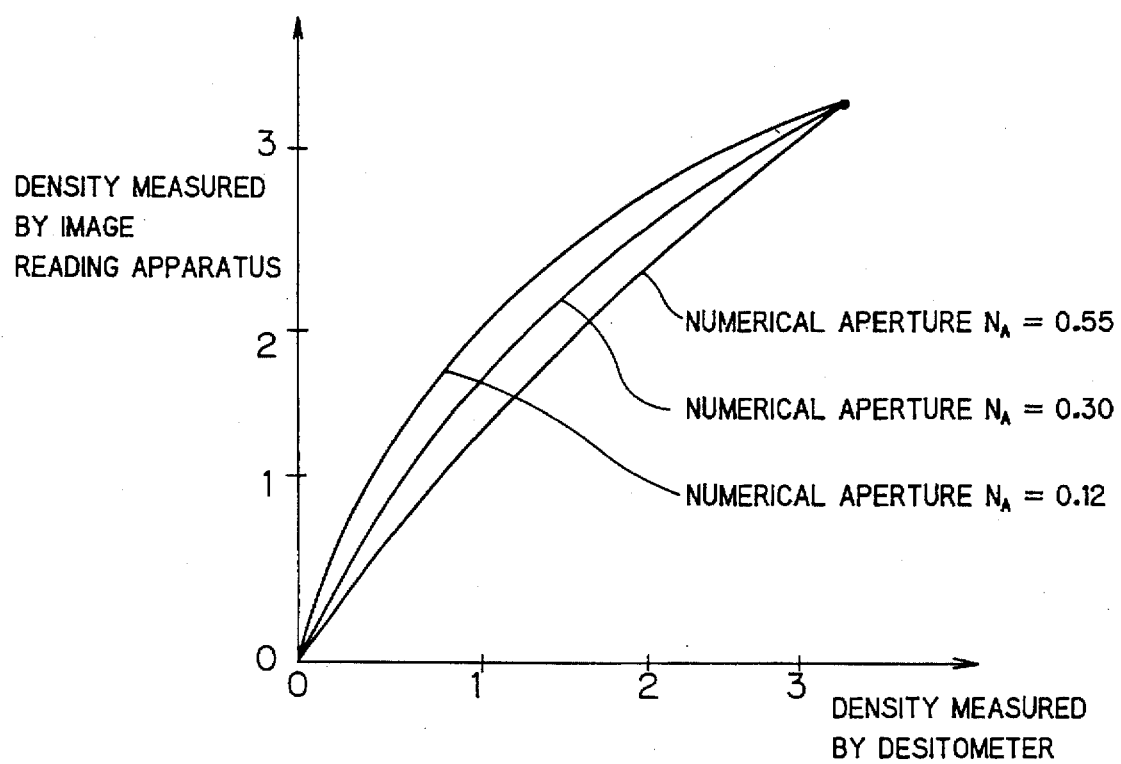
FIG. 15 is a graph showing a density characteristic which changes depending on the numerical aperture of illumination light.

Image signals $R_2$, $B_2$ and $G_2$ which are converted into digital data are corrected by a correction look-up table 52 (hereinafter "correction LUT 52") into corrected image signals $R_3$, $B_3$ and $G_3$, respectively. FIG. 11 shows a relationship between the image signal $R_2$ and the image signal $R_3$. As shown in FIG. 11, correction characteristics of the correction LUT 52 correspond to the characteristic of FIG. 15 as it is reversed. In a graph in which the image signal $R_2$ is measured along a horizontal axis and the corrected image signal is measured along a vertical axis, the characteristics are each expressed as a concave curve. A plurality of correction characteristics are prepared in accordance with a plurality of numerical apertures $N_A$ which can be selected. As the numerical aperture $N_A$ is smaller, the correction characteristic corrects a density to be lighter than the image signal $R_2$. Further, relationships between the image signal $B_2$ and the corrected image signal $B_3$, the image signal $G_2$ and the corrected image signal $G_3$ are each basically a characteristic which is expressed as a concave curve, similarly to the relationship between the image signal $R_2$ and the corrected image signal $R_3$. Of the plurality of the correction characteristics, an operator selects one which corresponds to information regarding a designated numerical aperture of the illumination light. Hence, the correction LUT 52 changes the correction characteristic in accordance with the numerical aperture of illumination light and outputs the corrected image signals $R_3$, $B_3$ and $G_3$. A correction LUT 53 serves as correcting means in the present invention.

The magnification control circuit 56 outputs data regarding the sub scanning speed $V_y$ to the sub scanning control circuit 58 so that the sub scanning motor 4 is driven at the sub scanning speed $V_y$. Further, the magnification control circuit 56 provides the image reading control circuit 59 with the selector signal SEL which changes in accordance with the image reading resolution RES. The image reading control circuit 59 drives the main aperture motor 5 and the field stop motor 6 so as to create an image reading region which is suitable to the image reading resolution RES. The speed of the main scanning motor 3 is controlled through the main scanning control circuit 57 so that the scanning drum 1 rotates at a constant peripheral velocity $V_x$ regardless of the image reading resolution.

When an operator inputs information regarding the numerical aperture $N_A$ of the illumination light on the operation panel 54, the main control part 55 outputs the selector signal SEL for selecting a correction characteristic of the correction LUT 53 in accordance with the inputted information. At the same time, the main control part 55 outputs a driving signal $DA_S$ for adjusting the aperture size of the variable aperture stop $A_S$ to the aperture stop control circuit 60 in accordance with the inputted information. The correction LUT 53 selects a correction characteristic based on the selector signal SEL. Hence, the image signals are corrected based on the selected correction characteristic. On the other hand, the aperture stop control circuit drives the aperture stop motor 7 in accordance with the driving signal $DA_S$, to thereby adjust the aperture size of the variable aperture stop $A_S$. The main control part 55 serves as changing means in the present invention.

The information regarding the numerical aperture $N_A$ of illumination light is inputted by an operator. When an original includes a scratch or is uneven, through the operation panel 54, the operator provides the main control part 55 with information which increases the aperture size (aperture diameter) of the variable aperture stop $A_S$ and hence the numerical aperture of the illumination light. Conversely, when the original 2 includes no scratch or is even, through the operation panel 54, the operator provides the main control part 55 with information which decreases the aperture size (aperture diameter) of the variable aperture stop $A_S$ and hence the numerical aperture of the illumination light.

Figure 12:
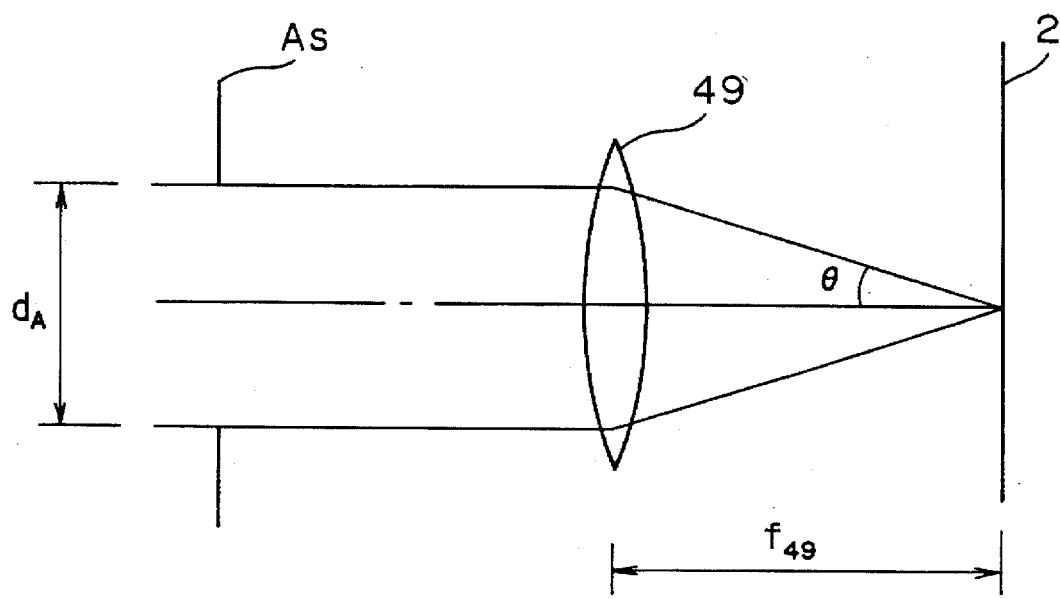
FIG. 12 is a graph showing a correction characteristic of a correction LUT.
Figure 13:
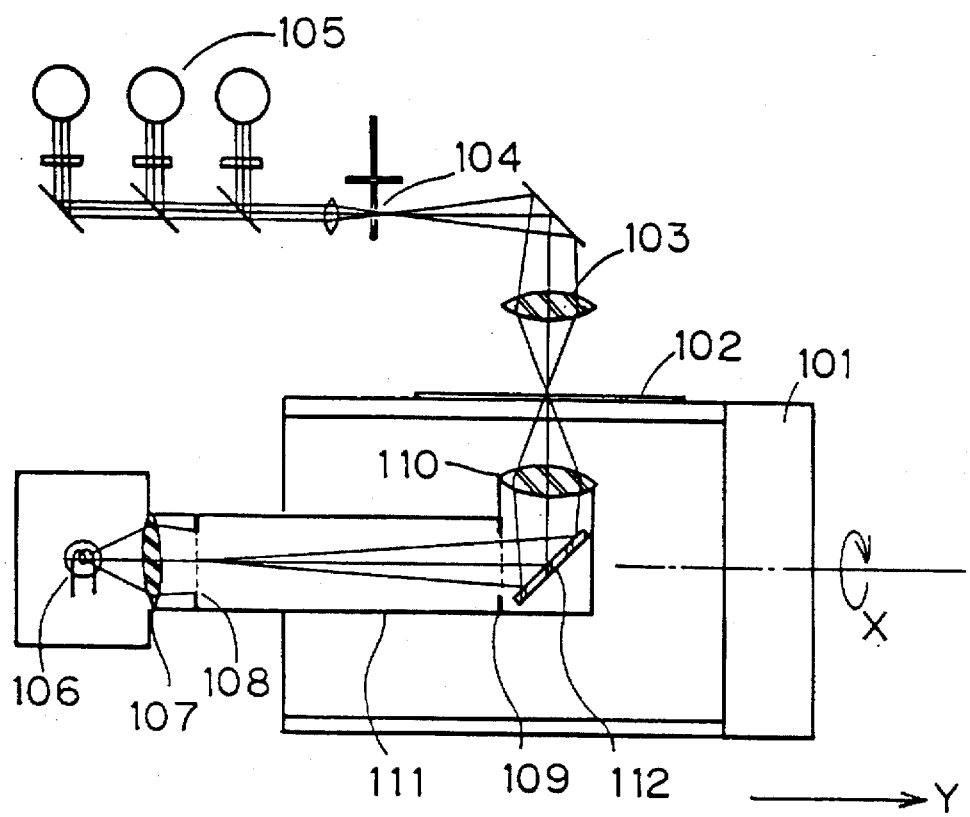
FIG. 13 is a view of an illumination optical system and an imaging optical system of a conventional image reading apparatus.
Figure 14:
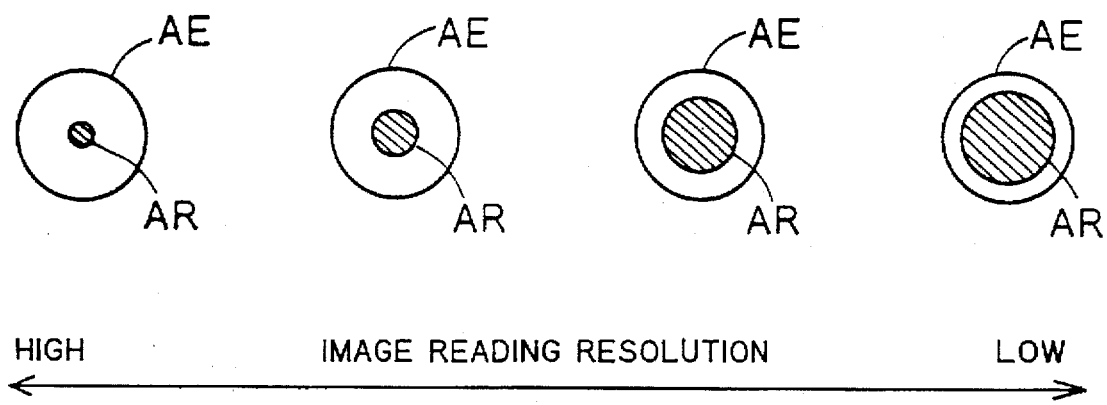
FIG. 14 is a view showing a relationship between an illumination region and an image reading region in the conventional image reading apparatus.

A relationship between the aperture diameter $d_A$ of the variable aperture stop $A_S$ and the numerical aperture $N_A$ of the illumination light is as shown in FIG. 12. FIG. 12 shows the variable aperture stop $A_S$ as it is positioned at the pupil of the condenser lens 49 for clarity of illustration. The numerical aperture $N_A$ is expressed as:

$$N_A = \sin\theta = \frac{d_A}{\sqrt{4f_{49}^2 + d_A^2}}$$

where $\theta$ is an angle of a light beam passing a periphery of the aperture stop with respect to the optical axis, and f49 is a distance between a principal point of the condenser lens 49 and the original 2. Hence, it is only necessary to change the aperture diameter $d_A$ of the variable aperture stop $A_S$ to change the numerical aperture $N_A$ of the illumination light. For instance, the aperture diameter $d_A$ may be increased in accordance with the equation above to increase the numerical aperture $N_A$ of the illumination light.

Thus, the aperture size of the variable aperture stop $A_S$ is adjusted based on information regarding the numerical aperture of illumination light which is defined by an operator, the image signals are corrected based on a correction characteristic which corresponds to the information, and the corrected image signals are then outputted. Since the corrected image signals are outputted, it is possible to obtain stable image signals even when the numerical aperture of illumination light is changed.

Although the variable aperture stop $A_S$ is disposed at the position where the secondary light source is formed in the improved apparatus above, the location of the variable aperture stop $A_S$ is not limited to this. The variable aperture stop $A_S$ may be disposed at any other position as far as disposed at the light source image or a position which is conjugate with the light source image, i.e., as far as disposed at the position of the pupil of the condenser lens 49 or a position which is conjugate with the pupil of the condenser lens 49. If located at the position $P_{30}$ where the secondary light source is formed, the variable aperture stop $A_S$ is positioned within the lamp house 28. This makes it easier to incorporate an automatic adjusting mechanism (e.g., a driving source, a driving force transmitting part) which automatically changes the aperture size (aperture diameter) of the variable aperture stop $A_S$. Meanwhile, when the aperture stop is disposed at a position which is conjugate with the light source image and which is closest to the original 2 (i.e., at the position of the pupil ($A_{S'}$) of the condenser lens 49 in the improved apparatus), it is possible to suppress an influence of vibration of the ray pipe 29 or other influence as much as possible, so that the original 2 is irradiated stably.

Further, the transmission optical system ET is a so-called Koehler illumination system in the improved apparatus above, the transmission optical system ET may be formed by a critical illumination system, by adjusting distances between the respective optical elements but without changing the basic elements. The effect created remains the same as in the structure in which the transmission optical system ET is formed by a Koehler illumination system.

Although the transmission optical system ET includes the relay lens 44 in the improved apparatus above, the relay lens 44 is not an essential element in the present invention. Rather, the transmission optical system ET may be formed without the relay lens 44 included as shown in FIG. 3B, while ensuring a similar effect to that created in the image reading apparatuses according to the preferred embodiments described above. When the transmission optical system ET is formed not to include the relay lens 44, the variable aperture stop $A_S$ may be disposed at the position $A_S$ where the light source image is focused as shown in FIG. 3A or at the position of the pupil ($A_{S'}$) of the condenser lens 49. In addition, the light source lamp 31 may be disposed at the position of the secondary light source which is utilized in the improved apparatus above, as shown in FIG. 3C. When the light source lamp 31 is disposed as such, the aperture stop $A_S$ may be disposed at the position of the pupil ($A_{S'}$) of the condenser lens 49.

In addition, while the condenser lens 49 is used as a part of the illumination optical system E which is shown in FIGS. 3A to 3C in the improved apparatus above, a zoom lens may be used instead. Where a zoom lens is used instead, when a magnification of the zoom lens is changed while fixing the size of the aperture stop $F_S$, the illumination region is changed as in the improved apparatus above.

Still further, although the image reading resolution in the main scanning direction X is determined by adjusting the frequency of the sampling clock CL in the improved apparatus above, the frequency of the sampling clock CL may be fixed constant and the rotation speed $V_X$ of the scanning drum 1 may be adjusted to determine the image reading resolution in the main scanning direction X. Alternatively, the image reading resolution in the main scanning direction X may be determined by adjusting both the sampling clock and the rotation speed $V_x$ of the scanning drum.

While the invention has been described in detail, the foregoing description is in all aspects illustrative and not restrictive. It is understood that numerous other modifications and variations can be devised without departing from the scope of the invention.

We claim:

1. A scanning image reading apparatus which reads an original, said apparatus comprising:

an illuminating optical system which generates light;

a scanner for scanning the light from the illumination optical system against an illumination region on the original;

an imaging optical system for forming an image on said original positioned in a reading region on an image focusing surface;

photoelectric conversion means for reading an image formed on said image focusing surface and outputting an image signal;

designating means for designating a change in image reading resolution;

image reading region changing means for changing the size of said reading region in accordance with an image reading resolution which is designated through said designating means; and illumination region changing means for changing said image illumination region in accordance with said image reading resolution which is designated through said designating means.

2. The scanning image reading apparatus of claim 1, wherein said illumination optical system comprises:

a light source;

a collector lens for converging light from said light source;

a condenser lens for converging light from said collector lens on said illumination region; and a field stop which is disposed a conjugate position with said original with respect to said condenser lens, and wherein said illumination region is changed when said illumination region changing means changes the size of said field stop.

3. The scanning image reading apparatus of claim 1, wherein said illumination optical system comprises:

a light source;

a collector lens for converging light from said light source;

a field lens;

a condenser lens for converging light from said field lens on said illumination region; and a field stop which is disposed a conjugate position with said original with respect to said condenser lens, and wherein said illumination region is changed when said illumination region changing means changes the size of said field stop.

4. The scanning image reading apparatus of claim 1, wherein said illumination optical system comprises:

a light source;

a collector lens for converging light from said light source;

a zoom lens for converging light from said collector lens on said illumination region; and a field stop which is disposed a conjugate position with said original with respect to said zoom lens, and wherein said illumination region is changed when said illumination region changing means changes the magnification of said zoom lens.

5. The scanning image reading apparatus of claim 1, wherein said illumination optical system comprises:

a light source;

a collector lens for converging light from said light source;

a field lens;

a zoom lens for converging light from said field lens on said illumination region; and a field stop which is disposed a conjugate position with said original with respect to said zoom lens, and wherein said illumination region is changed when said illumination region changing means changes the magnification of said zoom lens.

6. The scanning image reading apparatus of claim 3 or 5, wherein said illumination optical system further comprises a relay lens between said field lens and said condenser lens.

7. The scanning image reading apparatus of any one of claims 2 to 5, wherein said illumination optical system further comprises an aperture stop which is disposed at a position at which a light source image of said light source is formed or at a conjugate position with said light source image.

8. The scanning image reading apparatus of claim 1, wherein said imaging optical system comprises:

an imaging lens; and an aperture plate which is disposed at an optically conjugate position with said original with respect to said imaging lens, and wherein said image reading region is changed by changing the size of an aperture of said aperture plate, and said photoelectric conversion means reads the quantity of light which passes through said aperture.

9. The scanning image reading apparatus of claim 1, wherein said imaging optical system comprises:

an imaging lens; and an aperture plate which is disposed at an optically conjugate position with said original with respect to said imaging lens, and wherein said image reading region is changed when the magnification of said imaging lens is changed.

10. The scanning image reading apparatus of claim 1, wherein said imaging optical system comprises an imaging lens which is disposed at such a position that said original is conjugate with said photoelectric conversion means, and wherein said image reading region is changed when the magnification of said imaging lens is changed.

11. The scanning image reading apparatus of claim 1, wherein said illumination region is larger than said image reading region by an area which corresponds to a mechanical displacement which is created during assembling of said illumination optical system and said imaging optical system.

12. The scanning image reading apparatus of claim 1, wherein a ratio said illumination region to said image reading region is larger at a high image reading resolution side than at a low image reading resolution side.

13. The scanning image reading apparatus of claim 1, further comprising:

numerical aperture adjusting means for adjusting the numerical aperture of illumination light;

correcting means for correcting said image signal which is outputted by said photoelectric conversion means in accordance with a correction characteristic and for outputting a corrected image signal; and changing means for changing said correction characteristic in accordance with the numerical aperture of said illumination light.

14. The scanning image reading apparatus of claim 13, wherein as the numerical aperture of said illumination light is smaller, said correction characteristic corrects a density which is expressed by said corrected image signal so that said density becomes lighter than said image signal.

15. The scanning image reading apparatus of claim 13, wherein said illumination optical system comprises:

a light source;

a lens for converging light from said light source on an original; and a variable aperture stop which is disposed at a pupil of said lens or at an optically conjugate position with said pupil, and wherein the numerical aperture of said illumination light is adjusted by adjusting an aperture size of said variable aperture stop.

16. The scanning image reading apparatus of claim 6, wherein said illumination optical system further comprises an aperture stop which is disposed at a position at which a light source image of said light source is formed or at a conjugate position with said light source image.

* * * * *